US011922216B2

(12) United States Patent
Singh et al.

(10) Patent No.: US 11,922,216 B2
(45) Date of Patent: Mar. 5, 2024

(54) COMPUTE RESOURCES MANAGEMENT VIA VIRTUAL SERVICE CONTEXTS (VSC) IN COMPUTE CLUSTERS

(71) Applicant: Cisco Technology, Inc., San Jose, CA (US)

(72) Inventors: Akshya Kumar Singh, Fremont, CA (US); Sri Goli, Dublin, CA (US); Amitkumar Patel, Fremont, CA (US); Ravi Nag Chamarthy, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 709 days.

(21) Appl. No.: 17/077,352

(22) Filed: Oct. 22, 2020

(65) Prior Publication Data

US 2022/0129326 A1   Apr. 28, 2022

(51) Int. Cl.
*G06F 9/50* (2006.01)
*G06F 9/455* (2018.01)

(52) U.S. Cl.
CPC ........ *G06F 9/5027* (2013.01); *G06F 9/45558* (2013.01); *G06F 9/505* (2013.01); *G06F 9/5083* (2013.01); *G06F 2009/4557* (2013.01); *G06F 2009/45595* (2013.01)

(58) Field of Classification Search
CPC .... G06F 9/5083; G06F 9/45558; G06F 9/505; G06F 2009/4557; G06F 2009/45595
See application file for complete search history.

(56) References Cited

U.S. PATENT DOCUMENTS

| | | | |
|---|---|---|---|
| 2013/0179895 | A1 | 7/2013 | Calder et al. |
| 2017/0257432 | A1* | 9/2017 | Fu ....................... H04L 67/1014 |
| 2017/0373940 | A1 | 12/2017 | Shahab et al. |
| 2018/0295036 | A1 | 10/2018 | Krishnamurthy et al. |
| 2019/0347120 | A1 | 11/2019 | Kottomtharayil et al. |
| 2020/0204623 | A1 | 6/2020 | Einkauf et al. |
| 2020/0278813 | A1* | 9/2020 | Nilsson ................. G06F 3/0604 |

* cited by examiner

*Primary Examiner* — Jacob D Dascomb
(74) *Attorney, Agent, or Firm* — Lee & Hayes P.C.

(57) ABSTRACT

Techniques and mechanisms for managing workloads in compute clusters comprising compute nodes by managing the workloads at the resource level of the compute clusters. For example, virtual service contexts (VSCs) may be defined where the VSCs represent service classes. Policies may be defined with respect to each service class. These service classes are dynamically constructed based on business needs. Hence there is natural requirement for a user to construct and rebalance the compute resources for these service classes dynamically. The policies may be related to resources of the compute clusters for executing workload units in the compute clusters. Resources of the compute clusters may be allocated to each service class. Each workload unit may be assigned to a one of the service classes based on the service context or type of workload unit. The workload units may then be executed by the compute clusters using the resources in accordance with the policies.

19 Claims, 5 Drawing Sheets

| VSC 202 | SERVICE CLASS 204 | SERVICES 206 | POLICIES 208 | CONTROL GROUPS 210 |
|---|---|---|---|---|
| VSC-FIRST 202A | FIRST-TIER USER APPS 204A | APP1  APP2  APP3 | POLICIES 208A | CGROUP-FIRST-TIER 210A |
| VSC-SECOND 202B | SECOND-TIER USER APPS 204B | APP4  APP5  APP6 | POLICIES 208B | CGROUP-SECOND-TIER 210B |
| VSC-INFRA 202C | APP INFRA SERVICES 204C | ELASTIC  KAFKA  MONGODB | POLICIES 208C | CGROUP-INFRA 210C |
| VSC-CORE 202D | CORE INFRA SERVICES 204D | CRD CONTROLLER  ADMISSION CONTROLLER  CLUSTER DNS  TECH SUPPORT  I/O CONTROLLERS | POLICIES 208D | CGROUP-CORE 210D |
| VSC-SYSTEM 202E | CORE SYSTEM SERVICES 204E | ETCD  KUBE API SERVER  KUBE CONTROLLER  KUBE PROXY  KUBE VIRT | POLICIES 208E | CGROUP-SYSTEM 210E |

```
┌─────────────────────────────────────────────────────────────┐
│  PROVIDE VIRTUAL SERVICE CONTEXTS (VSCs), EACH VSC          │
│  REPRESENTING A CORRESPONDING SERVICE CLASS FOR USE OF      │
│  RESOURCES AT COMPUTE NODES OF A COMPUTE CLUSTER OF A       │
│  COMPUTING PLATFORM                                         │
│                                                             │
│                            402                              │
└─────────────────────────────────────────────────────────────┘
                              │
                              ▼
┌─────────────────────────────────────────────────────────────┐
│  PROVIDE POLICIES WITH RESPECT TO EACH SERVICE CLASS,       │
│  WHEREIN THE POLICIES ARE RELATED TO RESOURCES OF THE       │
│  COMPUTING PLATFORM FOR EXECUTING WORKLOAD UNITS AT         │
│  THE COMPUTE NODES                                          │
│                                                             │
│                            404                              │
└─────────────────────────────────────────────────────────────┘
                              │
                              ▼
┌─────────────────────────────────────────────────────────────┐
│  BASED AT LEAST IN PART ON A SERVICE CONTEXT OF WORKLOAD    │
│  UNIT, ASSIGN EACH WORKLOAD UNIT TO A CORRESPONDING ONE OF  │
│  THE VSCs, WHEREIN THE SERVICE CONTEXT IS DEFINED BASED     │
│  AT LEAST IN PART ON A BUSINESS REQUIREMENT DEFINED BY A    │
│  USER                                                       │
│                                                             │
│                            406                              │
└─────────────────────────────────────────────────────────────┘
                              │
                              ▼
┌─────────────────────────────────────────────────────────────┐
│  EXECUTE EACH WORKLOAD UNIT USING THE RESOURCES OF THE      │
│  COMPUTE CLUSTER IN ACCORDANCE WITH ASSIGNED POLICIES       │
│  CORRESPONDING TO ONE OF THE VSCs                           │
│                                                             │
│                            408                              │
└─────────────────────────────────────────────────────────────┘
```

FIG. 4

COMPUTE RESOURCES MANAGEMENT VIA VIRTUAL SERVICE CONTEXTS (VSC) IN COMPUTE CLUSTERS

TECHNICAL FIELD

The present disclosure relates generally to managing workloads in compute clusters comprising compute nodes by managing the workloads at the resource level of the compute clusters.

BACKGROUND

Today in microservices or services-based deployment in on-demand cloud computing platforms, on-prem computing platforms, and other types of distributed computing networks, it is vital to utilize compute resources in order to meet business service level agreements (SLAs). There are several ways these resources are allocated and managed at higher level but at the core of it, typically compute resources are allocated and managed at level of workload unit such as container, process. And in OS like Linux, this comes down to manage compute resources at container level by defining requests and limits that eventually are bound to a control group (cgroup). One may also define how the system manages such compute resources for the deployment. Managing the compute resources at the workload units level, such as the process/container level, does not scale in large compute clusters that host several application workflows built from kinds of microservices for a variety of reasons.

System performance is fundamental to building a generic compute cluster and the basis of the system performance is based on how efficiently one may distribute and enforce compute resources among microservices not only on a scheduled compute node but also across a compute cluster built out of several compute nodes. The adequate assignment of resource assignment and enforcement is vital to building a predictable compute cluster that may lead SLAs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 schematically illustrates an example of a table of VSCs for use in the computing platform of FIG. 1.

FIGS. 3 and 4 illustrate flow diagrams of example methods for managing workloads in compute clusters comprising compute nodes in the computing platform of FIG. 1 by managing the workloads at the resource level using VSCs.

DESCRIPTION OF EXAMPLE EMBODIMENTS

Overview

Figure 1:
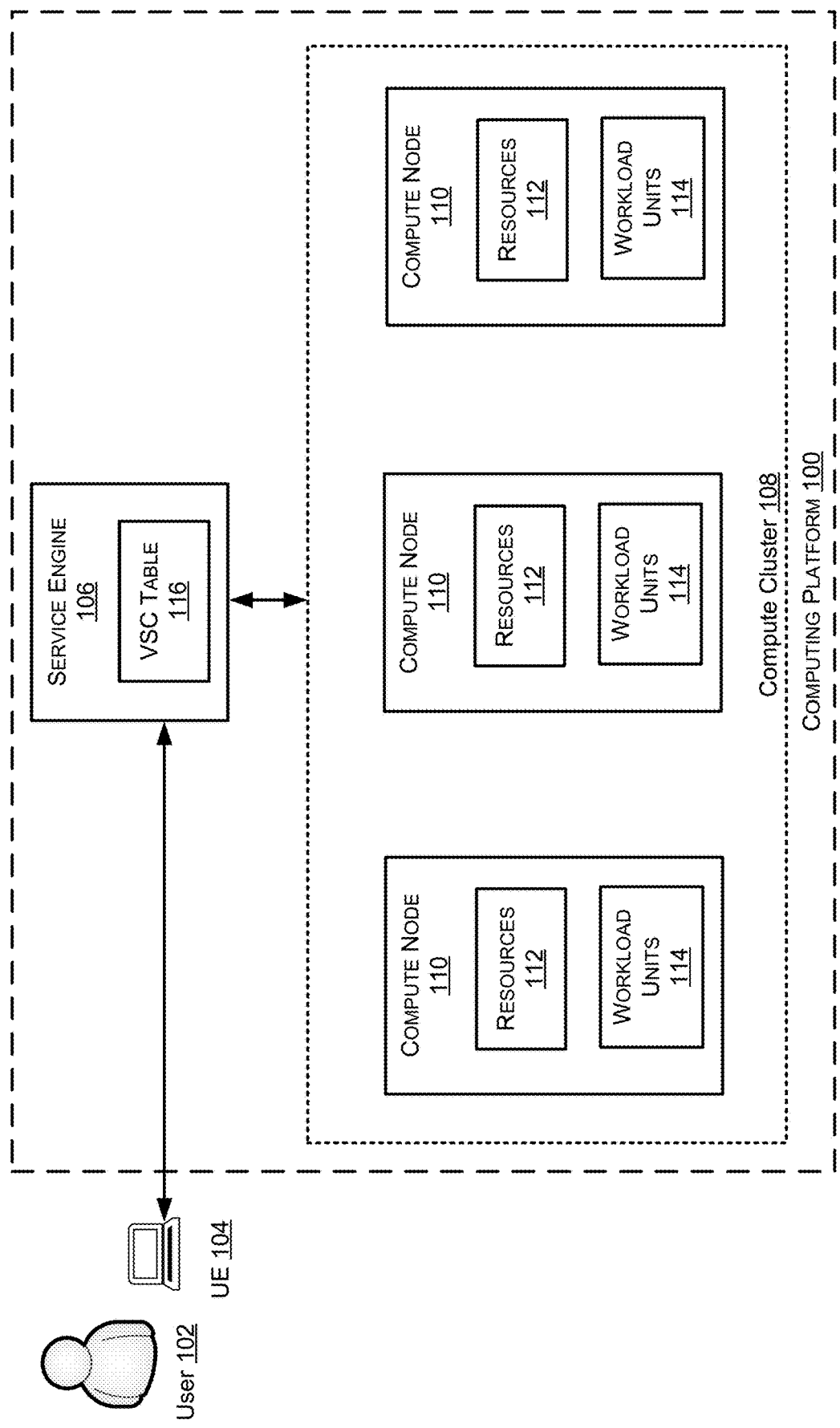
FIG. 1 schematically illustrates an example of a computing platform that provides various services (microservices) to users using virtual service contexts (VSCs).

System performance is fundamental to building a generic compute cluster and the core of building such a generic compute cluster lies in how efficiently one can distribute and enforce compute resources among microservices or services. The adequate achievement of resource assignment and enforcement is vital to building a predictable compute cluster that can lead to service level agreements (SLAs). Building a policy driven framework to group sets of workloads into different segments dynamically and manage resources at these levels is fundamental to not only simplifying overall operational aspects of compute clusters but core to building a predictable system to meet user intent in terms of SLAs. Compute platforms such as, for example, application centric infrastructure (ACI) service engine is built as a generic compute cluster that hosts a variety of apps and manages compute resources across apps, infra services, etc., is critical to providing a predicable system.

This disclosure describes techniques for managing workloads in compute clusters comprising compute nodes by managing the workloads of services by applying a set of business-driven policies to manage resources of the compute clusters. For example, virtual service contexts (VSCs) may be defined where the VSCs represent service classes. Policies may be defined with respect to each service class. The policies may be related to resources of the compute clusters for executing workload units in the compute clusters. Resources of the compute clusters may be allocated to each service class. Each workload unit may be assigned to a one of the service classes based on the service context or type of workload unit. The workload units may then be executed by the compute clusters using the resources in accordance with the policies.

In configurations, the compute clusters may be part of a computing platform such as an on-demand cloud computing platform, an on-prem computing platform, or other type of distributed computing network. In configurations, an orchestrator of the computing platform may be configured according to Kubernetes. The classes of service may include, for example, a first-tier service class of user apps, a second-tier service class of user apps, an app infra services service class, a core infra services service class, and a core system services service class. For each service class a control group (cgroup) may be defined. For example, for the first-tier service class of user apps, a cgroup-first may be defined. For the second-tier service class of user apps, a cgroup-second may be defined. For the app infra services service class, a cgroup-infra may be defined. For the core infra services service class, cgroup-core may be defined. For the core system services service class, a cgroup-system may be defined.

In configurations, the resources may comprise central processing units (CPUs), memory, storage, and network input/output (I/O). Additionally, in configurations, the policies may set upper and lower limits for the resources. For example, for a service group, a policy may include that workload units receive at least 3 CPUs and no more than 5 CPUs.

Accordingly, as an example of managing workloads in compute clusters comprising compute nodes by managing the resources at the workload level, in configurations, virtual service context (VSC) service classes are defined. Policies are defined with respect to each service class of the service classes, wherein the policies are related to resources of a computing platform for executing workload units in the computing platform. Based at least in part on the policies, resources of the computing platform are allocated to each service class of the plurality of service classes. Based at least in part on a service context or type of workload unit, each workload unit is assigned to a corresponding one of the service classes. The workload units are executed using the resources of the computing platform in accordance with the policies.

Additionally, the techniques described herein may be performed by a system and/or device having non-transitory computer-readable media storing computer-executable instructions that, when executed by one or more processors, performs the method described above.

Example Embodiments

Microservices deployed in the form of deployment units such as, for example, containers or virtual machines are managed via runtime systems such as, for example, docker, kernel-based virtual machines (KVM) etc. These runtime systems provide a way to manage compute resources for these deployment units. There are higher level abstractions like Kubernetes namespace, deployments, replicasets that lets one group sets of containers into a logical group. This works for different applications where one can put an application into a namespace and manage resources at each deployment unit level such as a container. This does not solve the problem of managing resources in a larger context where one can group services across different contexts, for example across namespaces, into a logical service context and enforce resources at that level.

For example, in the situation of an ACI service engine and Kubernetes, multi-layered services are provided such as, for example, a set of kube-system services (kube-apiserver, kube-controller, kubescheduled, kube-proxy, core-dns, etc.), a set of core infra services (admission controller, custom resources definitions (CRD) controller, security manager, etc.), a set of app infra services (Elastic, kafka, mongo database (db), tech support) and user apps. Currently, neither docker nor Kubernetes allows one to manage the resources in a generic way where one can group a set of workloads specific to a multi-layered service and manage compute resources. Docker allows one to pass cgroups per container, while Kubernetes allows one to define request/limits per container. In operation, both docker and Kubernetes use Linux cgroups to bind resources at the level of these workload units such as containers in cases of microservices deployment.

Kubernetes provides a way to define overall resource quotas at a namespace level in terms of managing CPU/memory at the namespace level across all the compute nodes within a cluster. Kubernetes defines a quality of service (QoS) for the workloads that are broadly divided into three classes (cgroups): guaranteed, burst, and best effort. All the containers from different namespaces are placed into one of these cgroups to manage the compute resources. This does not help much as it merely gives one control to put workload units into one of these pre-defined classes of service. However, there is no way to, for example, put sets of workloads (containers) from different namespaces into one cgroup and define resource limits and requests at this level. This is very important especially for on-prem computing platform deployments where a user is deploying sets (clusters) of compute nodes for specific business requirements or needs. Often, managing resources at the individual deployment unit level, such as the container level, is not feasible as it is hard to enforce the resulting policies when building a platform to host several of these apps of different business functions that each requires different SLAs at these services levels. Neither can one put sets of similar services into one namespace as this defeats the very basic purpose of using namespaces to isolate kernel resources.

Thus, in configurations, a framework is provided that allows users to define virtual service contexts (VSCs) to group sets of services and assign compute resources in terms of resource requests and limits to the VSCs. Linux cgroups are hierarchical, meaning that each cgroup has a parent from which it inherits properties, all the way up to the root cgroup that is created at system start. The VSC framework provides for creation of cgroups to logically represent a VSC that adds soft and hard limits to a specific cgroup based on VSC configuration. All the workload units are placed under these named VSC cgroups depending on the service context of the workload units. In configurations, a default service context may be used for all non-classified services.

In configurations, a user utilizing user equipment, e.g., some type of a computing device, may access the computing platform via a service engine. The computing platform includes a compute cluster that includes multiple compute nodes that provide microservices in the form of resources, e.g., compute resources, for executing workloads in the computing platform.

The user may access the computing platform via the service engine for executing workloads in the form of workload units at the compute nodes. In configurations, a table at the service engine may define virtual service contexts (VSCs). The VSCs may represent a plurality of service classes. Policies associated with the VSCs may be defined. The policies are related to the resources of the computing platform at the compute nodes. For example, in configurations, the resources may comprise central processing units (CPUs), memory, storage, and network input/output (I/O). In configurations, the service classes may comprise one or more of a first-tier user apps service class (VSC-first), a second-tier user apps service class (VSC-second), an app infra services service class (VSC-Infra), core infra services service class (VSC-core) and core system services service class (VSC-system).

In configurations, the first-tier user apps may include, for example, a first app, a second app, and a third app. The second-tier user apps may include a fourth app, a fifth app, and a sixth app. The first-tier user apps may be placed under an associated VSC cgroup (e.g., cgroup-first-tier). Likewise, the second-tier user apps may be placed within an associated VSC cgroup, e.g., cgroup-second-tier.

In configurations, app infra services such as, for example, elastic services, Kafka, Mongo database (db), and Tech Support, may be placed within a VSC croup-infra. Core infra services such as, for example, cardfile custom resources definitions (CRD) Controller, Admission Controller, Cluster Domain Name Service (DNS), and Input/Output (I/O) Controllers, may be placed within the cgroup-core. Finally, core system services such as, for example, ETCD, Kube API Server, Kube Controller, Kube Proxy, and Kube Virt, may be placed within the cgroup-system. Thus, the example arrangement utilizes Kubernetes as the system orchestrator, although other system orchestrators may be used. The system orchestrator controls the resources.

In configurations, the policies may define at least a lower limit of each resource for each service class. For example, the first-tier user apps workload units may have a policy wherein each workload unit may be entitled to a minimum of three CPUs. Additionally, the policies may define an upper limit of each resource for each service class. For example, workload units for the first-tier user apps may have an upper limit of five CPUs.

In configurations, an operator of the computing platform may define the VSCs and the service classes. In configurations, the user may define the VSCs and the service classes.

In some configurations, the user may define the VSCs and the service classes by changing the VSCs and service classes defined by the operator of the computing platform. Additionally, a supplier or provider of the service engine may define the VSCs and the service classes. In such configurations, the user may once again change the VSCs and the service classes. The operator of the computing platform, the user of the computing platform, and/or the supplier or provider of the service engine may also set the policies associated with the resources for each service class.

Utilizing and defining virtual service contexts to group sets of services and assign compute resources in terms of requests and limits to the virtual service contexts allows for the management of compute resources to become dynamic and much more efficient in terms of user intent of service. Additionally, a layer of service abstraction is created and a user may define the layer of service abstraction dynamically based on business intents. Furthermore, adequate compute resource assignment and enforcement is proxy for overall SLAs. Thus, the chance that a user will experience a service failure is smaller and helps vendors to offer better SLAs in terms of overall service availability. Additionally, the more nodes and services that are provided within a computing platform, the harder it is to manage and keep track of the resources given that so much of system orchestrators, e.g., Kubernetes, is automated. Having a large node/services count is not a huge obstacle in this respect. However, the user has to provision and monitor every deployment unit on every node. Having a policy-based resource management at the virtual service levels goes a long way in simplifying overall operational aspects of compute clusters. By creating the VSCs, services are not only controlled in terms of their placements, but also the user may categorize services to define resource priority based on factors that would constitute service performance from a business angle.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example of a computing platform 100 that provides various services (microservices) to users. In configurations, a user 102 utilizing user equipment (UE) 104, e.g., some type of a computing device, may access the computing platform 100 via a service engine 106. The computing platform 100 includes a compute cluster 108 that includes multiple compute nodes 110 that provide the microservices in the form of resources 112, e.g., compute resources, for executing workload 114 in the computing platform 100. The user 102 may access the computing platform 100 via the service engine 106 for executing workloads in the form of workload units 114 at the compute nodes 110. In configurations, a VSC table 116 at the service engine 106 may define virtual service contexts (VSCs), as further described herein. As is known, the computing platform 100 generally includes multiple compute clusters 108, as well as other types of components not illustrated. The VSCs allow the user to manage the workloads of microservices provided by the computing platform 100 by applying a set of business driven policies to manage the resources of the compute cluster 108.

FIG. 2 schematically illustrates the table 116. VSCs 202 may represent service classes 204 for services 206. Policies 208 associated with the VSCs 202 and service classes 204 may be defined with respect to each service class 204. The policies 208 are related to the use of resources 112 of the computing platform 100 at the compute nodes 110 when executing workload units 114. For example, in configurations, the resources 112 may comprise central processing units (CPUs), memory, storage, and network input/output (I/O). As previously noted, the policies 208 are business driven based on the business needs of the user 102.

In configurations, the service classes 204 may comprise one or more of a first-tier user apps service class 204a (e.g., VSC-first 202a), a second-tier user apps service class 204b (e.g., VSC-second 202b), an app infra services service class 204c (e.g., VSC-Infra 202c), core infra services service class 204d (e.g., VSC-core 202d), and core system services service class 204e (e.g., VSC-system 202e). Policies 208a, 208b, 208c, 208d, and 208e are defined for each corresponding service class 204. Corresponding control groups (cgroups) 210 are also defined as further described herein.

In the example of FIG. 2, the first-tier user apps service class 204a may include, for example, a first app (App1), a second app (App2), and a third app (App3). The second-tier user apps service class 204b may include a fourth app (App4), a fifth app (App5), and a sixth app (App6). The first-tier user apps App1, App2, and App3 may be placed within an associated VSC cgroup, e.g., cgroup-first-tier 210a. Likewise, the second-tier user apps App4, App5, App6 may be placed within an associated VSC cgroup, e.g., cgroup-second-tier 210b.

In configurations, app infra services such as, for example, elastic services, Kafka, Mongo database (db), and Tech Support, may be placed within a associated VSC cgeoup, e.g., cgroup-infra 210c. Core infra services such as, for example, Custom Resource Definitions (CRD) Controller, Admission Controller, Cluster Domain Name Service (DNS), and Input/Output (I/O) Controllers, may be placed within an associated VSC cgroup, e.g., cgroup-core 210d. Finally, core system services such as, for example, ETCD, Kube API Server, Kube Controller, Kube Proxy, and Kube Virt, may be placed within an associated VSC cgroup, e.g., cgroup-system 210e. Thus, the example arrangement of FIG. 2 utilizes Kubernetes as the system orchestrator, although other system orchestrators may be used. As is known, in configurations, the system orchestrator controls the resources 112.

In configurations, the policies 208 may define at least a lower limit of each resource for each service class 204. For example, the first-tier user apps (App1, App2, App3) may have a corresponding policy of policies 208a where each workload unit to be executed by a first-tier app (App1, App2, App3) may be entitled to a minimum of three CPUs. Additionally, the policies 208a include a policy that defines an upper limit of each resource for each service class. For example, the first-tier user apps (App1, App2, App3) may have a corresponding policy 208 wherein each workload unit to be executed by a first-tier app (App1, App2, App3) may have an upper limit of five CPUs.

In configurations, an operator of the computing platform 100 may define the VSCs 202, the service classes 204, and/or the policies 208. In configurations, the user 102 may define the VSCs 202, the service classes 204, and/or the policies 208 based on business needs of the user 102. In some configurations, the user 102 may define the VSCs 202, the service classes 204, and/or the policies 208 by changing the VSCs 202, the service classes 204, and the policies 208 defined by the operator of the computing platform 100. Additionally, a supplier or provider of the service engine 106 may define the VSCs 202, the service classes 204, and/or the policies 208. In such configurations, the user 102 may change the VSCs 202, the service classes 204, and/or the policies 208. A default service context may be defined for all non-classified services. In configurations, as the needs of the user 102 change, the policies 208 associated with the VSCs 202 and the service classes 204 may be dynamically changed by the user 102 to address the changing needs of the user 102. Additionally, in configurations, as the needs of the user 102 change, the VSCs 202 and/or the service classes 204 may be dynamically changed by the user 102 to address the changing needs of the user 102.

Thus, when executing workloads on behalf of the user 102, the service engine 106 may determine a service context or type of workload unit 114 (or entire workload) and determine which VSC 202 and/or service class 204 is needed at a compute node 110. The workload unit 114 may be assigned to a compute node 110 and the compute node 110 may execute the workload unit 114 in accordance with the policies 208 associated with the determined VSC 202 and/or service class 204. For example, if App1 is to be executed, the service engine 106 determines that VSC-first 204*a* applies and that cgroup-first 210*a* controls. Policies 208*a* are applied by the compute node 110 while executing the workload units 114 associated with App1. If workload units 114 are directed to I/O controllers, then the service engine 106 determines that VSC-core 204*d* applies and that cgroup-core 210*d* controls. Policies 208*d* are applied by the compute node 110 while executing the workload units 114 associated with I/O controllers.

Utilizing and defining the VSCs 202 to group sets of services 204 and assign compute resources 112 in terms of requests and limits to the VSCs 202 allows for the management of compute resources 112 to become dynamic and much more efficient in terms of user intent of service. Additionally, a layer of service abstraction is created and a user may define the layer of service abstraction dynamically based on business intents. Furthermore, adequate compute resource assignment and enforcement is proxy for overall SLAs. Thus, the chance that a user will experience a service failure is smaller and helps vendors to offer better SLAs in terms of overall service availability. Additionally, the more compute nodes 110 and services that are provided within the computing platform 100, the harder it is to manage and keep track of the individual resources. Given that so much of system orchestrators, e.g., Kubernetes, is automated, having a large node/services count is not a huge obstacle in this respect. However, the user has to provision and monitor every deployment unit on every node. Having a policy-based resource management at the virtual service levels goes a long way in simplifying overall operational aspects of compute clusters. By creating the VSCs 202, services are not only controlled in terms of their placements, but also the user may categorize services to define resource priority based on factors that would constitute service performance from a business angle.

Figure 3:
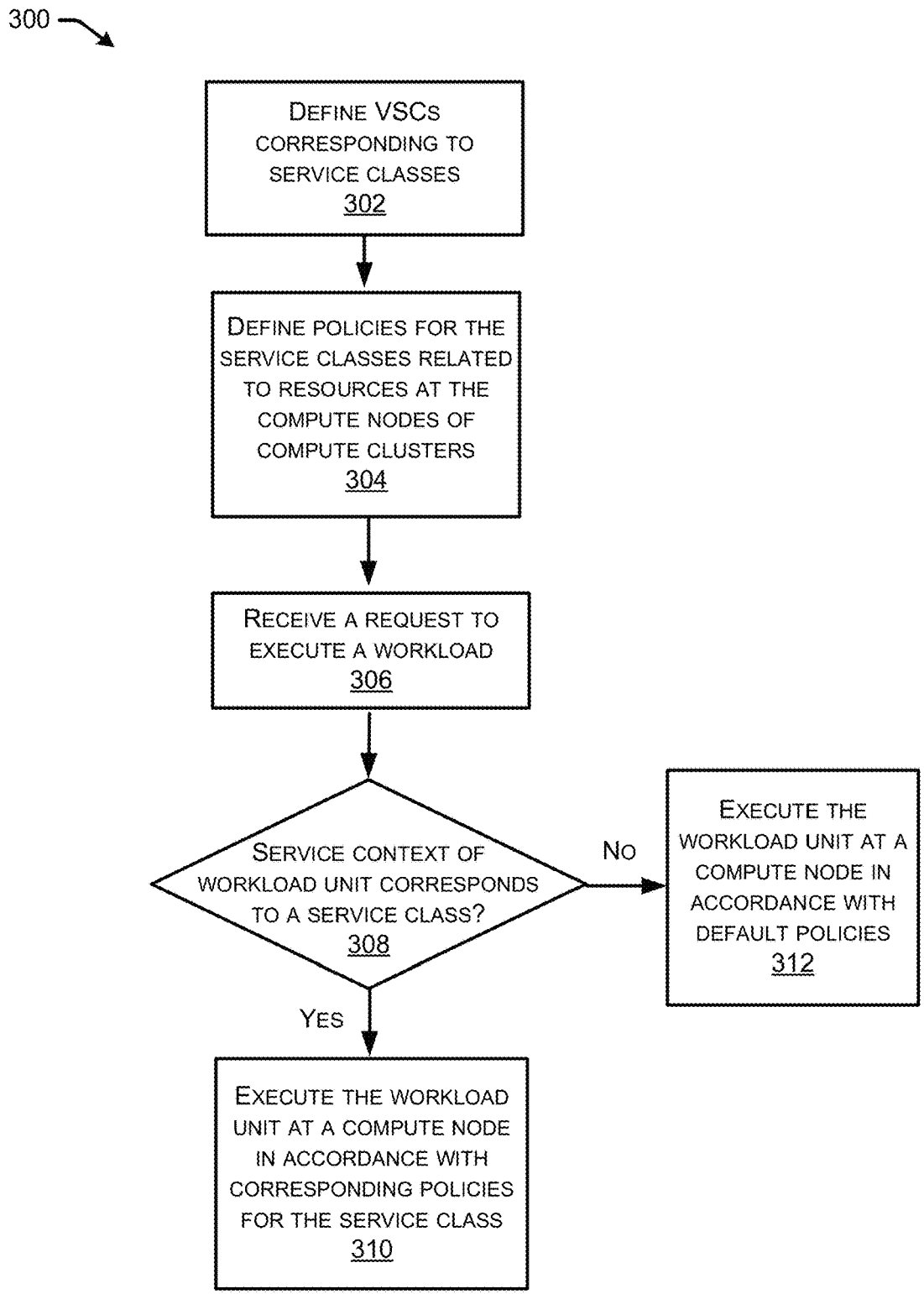

FIGS. 3 and 4 illustrate flow diagrams of example methods 300 and 400, respectively, that illustrate aspects of the functions performed at least partly by the service engine 106 as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrate a flow diagram of an example method 300 for managing workloads in compute clusters, e.g., compute clusters 108, comprising compute nodes, e.g., compute nodes 110, by managing the workloads at the resource level. In some examples, the at least some of the techniques of method 300 may be performed by a service engine, e.g., service engine 106. In such examples, the service engine may comprise one or more hardware interfaces configured to send and receive commands and/or packets of data in the computing platform 100, one or more processors, and one or more non-transitory computer-readable media storing computer-executable instructions that, when executed by the one or more processors, cause the one or more processors to perform steps of method 300.

At 302, VSCs corresponding to service classes may be defined. For example, VSCs 202 and service classes 204 may be defined. The service classes 204 may comprise one or more of a first-tier user apps service class 204*a* (e.g., VSC-first 202*a*), a second-tier user apps service class 204*b* (e.g., VSC-second 202*b*), an app infra services service class 204*c* (e.g., VSC-Infra 202*c*), core infra services service class 204*d* (e.g., VSC-core 202*d*), and core system services service class 204*e* (e.g., VSC-system 202*e*). The first-tier user apps App1, App2, and App3 may be placed within an associated VSC cgroup, e.g., cgroup-first-tier 210*a*. Likewise, the second-tier user apps App4, App5, App6 may be placed within an associated VSC cgroup, e.g., cgroup-second-tier 210*b*. The app infra services such as, for example, elastic services, Kafka, Mongo database (db), and Tech Support, may be placed within a associated VSC cgeoup, e.g., cgroup-infra 210*c*. The core infra services such as, for example, Custom Resource Definitions (CRD) Controller, Admission Controller, Cluster Domain Name Service (DNS), and Input/Output (I/O) Controllers, may be placed within an associated VSC cgroup, e.g., cgroup-core 210*d*. Finally, the core system services such as, for example, ETCD, Kube API Server, Kube Controller, Kube Proxy, and Kube Virt, may be placed within an associated VSC cgroup, e.g., cgroup-system 210*e*.

At 304, policies for the service classes related to resources at the compute nodes of compute clusters may be defined. For example, policies 208 associated with the VSCs 202 and service classes 204 may be defined with respect to each service class 204. The policies 208 are related to the resources 112 of the computing platform 100 at the compute nodes 110 of the compute clusters 108. For example, in configurations, the resources 112 may comprise central processing units (CPUs), memory, storage, and network input/output (I/O).

At block 306, a request may be received to execute a workload. For example, the service engine 106 may receive a request from the user 102 to execute a workload.

At block 308, it may be determined if a service context of workload units of the workload correspond to a service class. For example, when executing workloads on behalf of the user 102, the service engine 106 may determine a service context or type of workload unit 114 (or the entire workload) and determine which VSC 202 and/or service class 204 is needed at a compute node 110.

At block 310, if the service context of the workload unit corresponds to a service class, the workload unit is executed at a compute node in accordance with corresponding policies for the service class. For example, the workload unit 114 may be assigned to a compute node 110 and the compute node 110 may execute the workload unit 114 in accordance with the policies 208 associated with the determined VSC 202 and/or service class 204. For example, if App1 is to be executed, the service engine 106 determines that VSC-first 204a applies and that cgroup-first 210a controls. Policies 208a are applied by the compute node 110 while executing the workload units 114 associated with App1. If workload units 114 are directed to I/O controllers, then the service engine 106 determines that VSC-core 204d applies and that cgroup-core 210d controls. Policies 208d are applied by the compute node 110 while executing the workload units 114 associated with I/O controllers.

At block 312, if the service context of the workload unit does not correspond to a service class, the workload unit is executed at a compute node in accordance with default policies. For example, the workload unit 114 may be assigned to a compute node 110 and the compute node 110 may execute the workload unit 114 in accordance with default policies associated with a default service context that may be defined for all non-classified services.

FIG. 4 illustrates a flow diagram of an example method 400 for managing workloads in compute clusters, e.g., compute clusters 108, comprising compute nodes, e.g., compute nodes 110, by managing the workloads at the resource level. In some examples, at least some of the techniques of method 400 may be performed by a service engine, e.g., service engine 106. In such examples, the controller may comprise one or more hardware interfaces configured to send and receive commands and/or packets of data in the rack server system 100, one or more processors, and one or more non-transitory computer-readable media storing computer-executable instructions that, when executed by the one or more processors, cause the one or more processors to perform steps of method 400.

At 402, virtual service contexts (VSCs) may be provided, each VSC representing a corresponding service class for use of resources at compute nodes of a compute cluster of a computing platform. For example, VSCs 202 and service classes 204 may be provided. The service classes 204 may comprise one or more of a first-tier user apps service class 204a (e.g., VSC-first 202a), a second-tier user apps service class 204b (e.g., VSC-second 202b), an app infra services service class 204c (e.g., VSC-Infra 202c), core infra services service class 204d (e.g., VSC-core 202d), and core system services service class 204e (e.g., VSC-system 202e). The first-tier user apps App1, App2, and App3 may be placed within an associated VSC cgroup, e.g., cgroup-first-tier 210a. Likewise, the second-tier user apps App4, App5, App6 may be placed within an associated VSC cgroup, e.g., cgroup-second-tier 210b. The app infra services such as, for example, elastic services, Kafka, Mongo database (db), and Tech Support, may be placed within a associated VSC cgeoup, e.g., cgroup-infra 210c. The core infra services such as, for example, Custom Resource Definitions (CRD) Controller, Admission Controller, Cluster Domain Name Service (DNS), and Input/Output (I/O) Controllers, may be placed within an associated VSC cgroup, e.g., cgroup-core 210d. Finally, the core system services such as, for example, ETCD, Kube API Server, Kube Controller, Kube Proxy, and Kube Virt, may be placed within an associated VSC cgroup, e.g., cgroup-system 210e.

At 404, policies with respect to each service class may be provided, wherein the policies are related to the resources of the computing platform for executing workload units at the compute nodes. For example, policies 208 associated with the VSCs 202 and service classes 204 may be defined with respect to each service class 204. The policies 208 are related to the resources 112 of the computing platform 100 at the compute nodes 110 of the compute clusters 108. For example, in configurations, the resources 112 may comprise central processing units (CPUs), memory, storage, and network input/output (I/O).

At 406, based at least in part on a service context of workload unit, assigning each workload unit to a corresponding one of the VSCs, wherein the service context is defined based at least in part on a business requirement defined by a user. For example, the service engine 106 may assign a workload unit 114 to a service class 204 and the workload unit may be executed at a compute node 110 in accordance with corresponding policies 208 for the service class 204. For example, if App1 is to be executed, the service engine 106 determines that VSC-first 204a applies and that cgroup-first 210a controls. The service engine 106 may assign the workload units 114 to service class 204a. Policies 208a are applied by the compute node 110 while executing the workload units 114 associated with App1. If workload unit 114 is directed to I/O controllers, then the service engine 106 determines that VSC-core 204d applies and that cgroup-core 210d controls. The service engine 106 may assign the workload units 114 to service class 204d. Policies 208d are applied by the compute node 110 while executing the workload units 114 associated with I/O controllers.

At 408, each workload unit is executed using the resources of the compute cluster in accordance with assigned policies corresponding to one of the VSCs. For example, as previously noted, if App1 is to be executed, the service engine 106 determines that VSC-first 204a applies and that cgroup-first 210a controls. Policies 208a are applied by the compute node 110 while executing the workload units 114 associated with App1. If workload units 114 are directed to I/O controllers, then the service engine 106 determines that VSC-core 204d applies and that cgroup-core 210d controls. Policies 208d are applied by the compute node 110 while executing the workload units 114 associated with I/O controllers.

Figure 5:
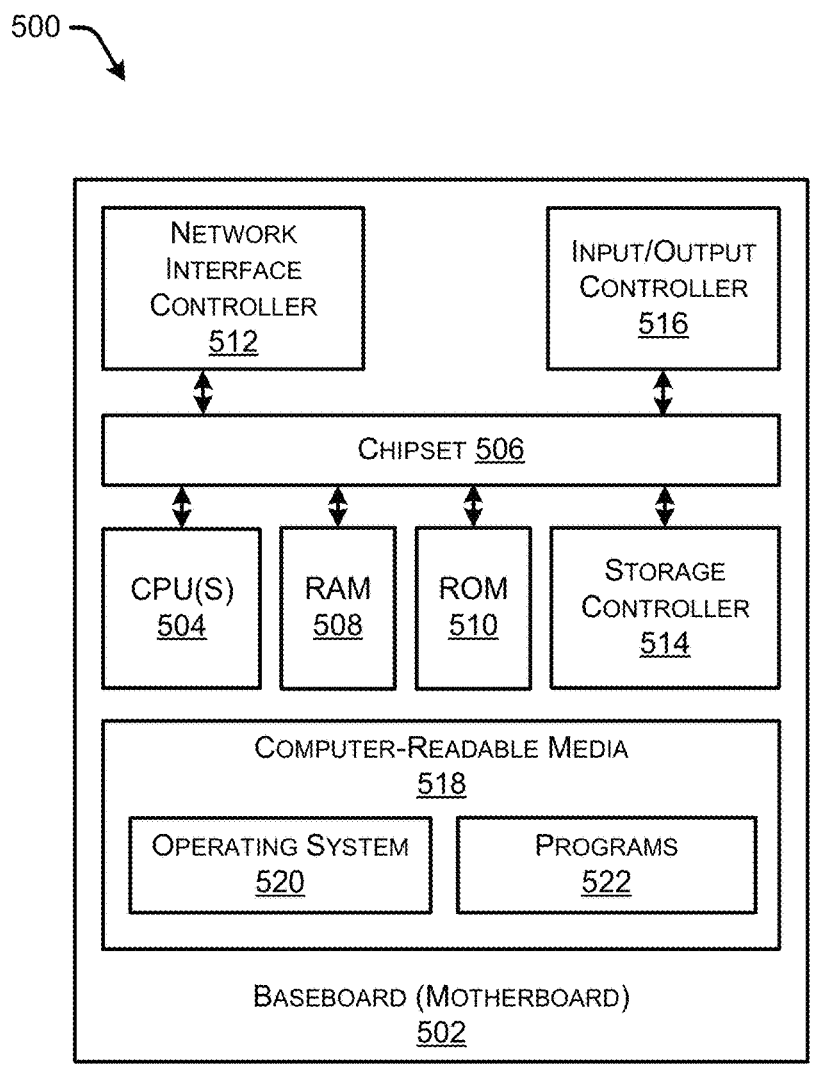
FIG. 5 is a computer architecture diagram showing an illustrative computer hardware architecture for implementing one or more elements of a computing platform that can be utilized to implement aspects of the various technologies presented herein.

FIG. 5 shows an example computer architecture for a computer 800 capable of executing program components for implementing the functionality described above. One or more computers 800 shown in FIG. 5 may be used to implement one or more elements of the example computing platform 100 described herein, and may comprise a conventional server computer, workstation, desktop computer, laptop, tablet, network appliance, e-reader, smartphone, or other computing device, and can be utilized to execute any of the software components presented herein. In some examples, however, the computer 500 may correspond to networked devices such as servers, switches, routers, hubs, bridges, gateways, modems, repeaters, access points, etc., and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500. The CPUs 504 may, in configurations, correspond to CPUs 110.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the computing platform 100, and or any components included therein, may be supported by one or more devices similar to computer 500. Stated otherwise, some or all of the operations performed by the rack server system 100, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The programs 522 may comprise any type of programs or processes to perform the techniques described in this disclosure for managing workloads in compute clusters comprising compute nodes by managing the workloads at the resource level of the compute clusters. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
 providing virtual service contexts (VSCs), each VSC representing a corresponding service class for use of resources at compute nodes of a compute cluster of a computing platform;
 providing one or more policies with respect to each service class, wherein the one or more policies are related to the resources of the computing platform for executing workload units at the compute nodes, wherein the resources comprise central processing units (CPUs), memory, storage, and network input/output (I/O), and wherein the policies define at least a lower limit of each resource for each service class and an upper limit of each resource for each service class;
 based at least in part on a service context of each workload unit, assigning each workload unit to a corresponding one of the VSCs, wherein the service context is defined based at least in part on a business requirement defined by a user; and
 executing each workload unit using the resources of the compute cluster in accordance with assigned policies corresponding to one of the VSCs.

2. The method of claim 1, further comprising changing at least one of the one or more policies, the service context, or the VSCs based on a change in the business requirement of the user.

3. The method of claim 1, wherein the service classes comprise:
 a first-tier user apps service class;
 a second-tier user apps service class;
 an app infra services service class;
 a core infra services service class; and
 a core system services service class.

4. The method of claim 1, wherein the VSC is defined by an operator of the computing platform.

5. The method of claim 4, wherein the service context of workload units is defined by the operator of the computing platform.

6. The method of claim 1, wherein the VSC is defined by the user.

7. The method of claim 6, wherein the service context of workload units is defined by the user.

8. One or more non-transitory computer-readable media storing computer-executable instructions that, when executed by one or more processors, cause the one or more processors to perform actions comprising:
 providing virtual service contexts (VSCs), each VSC representing a corresponding service class for use of resources at compute nodes of a compute cluster of a computing platform;
 providing one or more policies with respect to each service class, wherein the one or more policies are related to the resources of the computing platform for executing workload units at the compute nodes, wherein the resources comprise central processing units (CPUs), memory, storage, and network input/output (I/O), and wherein the policies define at least a lower limit of each resource for each service class and an upper limit of each resource for each service class;
 based at least in part on a service context of each workload unit, assigning each workload unit to a corresponding one of the VSCs, wherein the service context is defined based at least in part on a business requirement defined by a user; and
 executing each workload unit using the resources of the compute cluster in accordance with assigned policies corresponding to one of the VSCs.

9. The one or more non-transitory computer-readable media of claim 8, wherein the actions further comprise changing at least one of the one or more policies, the service context, or the VSCs based on a change in the business requirement of the user.

10. The one or more non-transitory computer-readable media of claim 8, wherein the service classes comprise:
 a first-tier user apps service class;
 a second-tier user apps service class;
 an app infra services service class;
 a core infra services service class; and
 a core system services service class.

11. The one or more non-transitory computer-readable media of claim 8, wherein the VSC is defined by an operator of the computing platform.

12. The one or more non-transitory computer-readable media of claim 11, wherein the service context of workload units is defined by the operator of the computing platform.

13. The one or more non-transitory computer-readable media of claim 8, wherein the VSC is defined by the user.

14. The one or more non-transitory computer-readable media of claim 13, wherein the service context of workload unit is defined by the user.

15. A method comprising:
   providing policies with respect to each service class of a plurality of service classes, wherein the policies are related to resources of a computing platform for executing workload units in the computing platform, wherein the resources comprise central processing units (CPUs), memory, storage, and network input/output (I/O), and wherein the policies define at least a lower limit of each resource for each service class and an upper limit of each resource for each service class;
   based at least in part on a service context of each workload unit, assigning each workload unit to a corresponding one of the plurality of service classes; and
   executing the workload units using the resources of a compute cluster of the computing platform in accordance with policies associated with the services classes.

16. The method of claim 15, further comprising changing at least one of the policies or the service context of workload units based on a change in a business requirement of a user.

17. The method of claim 15, wherein the plurality of service classes comprise:
   a first-tier user apps service class;
   a second-tier user apps service class;
   an app infra services service class;
   a core infra services service class; and
   a core system services service class.

18. The method of claim 15, wherein the service context of workload units is defined by an operator of the computing platform.

19. The method of claim 15, wherein the service context of workload units is defined by a user.

* * * * *